L. L. FUNK.
SOLDERING TOOL.
APPLICATION FILED JAN. 21, 1910.
1,006,543.
Patented Oct. 24, 1911.
2 SHEETS—SHEET 2.
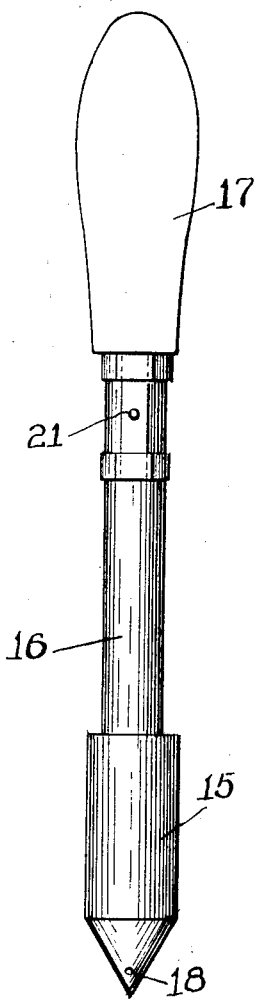
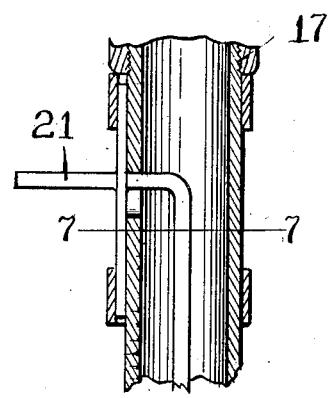
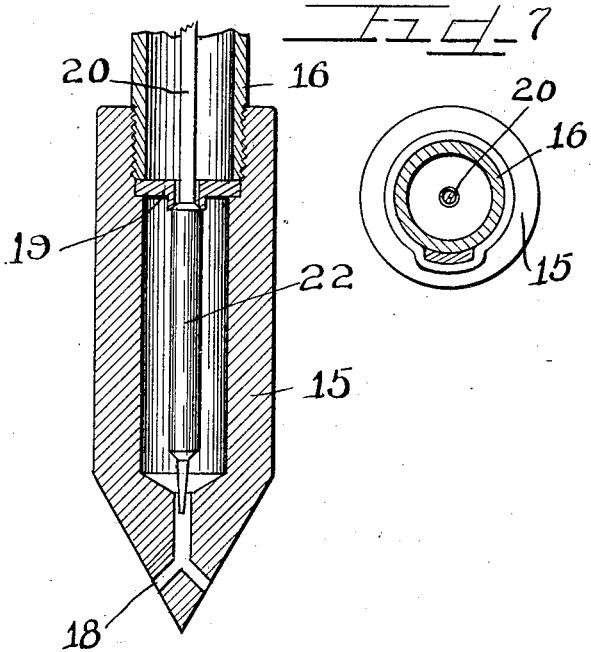

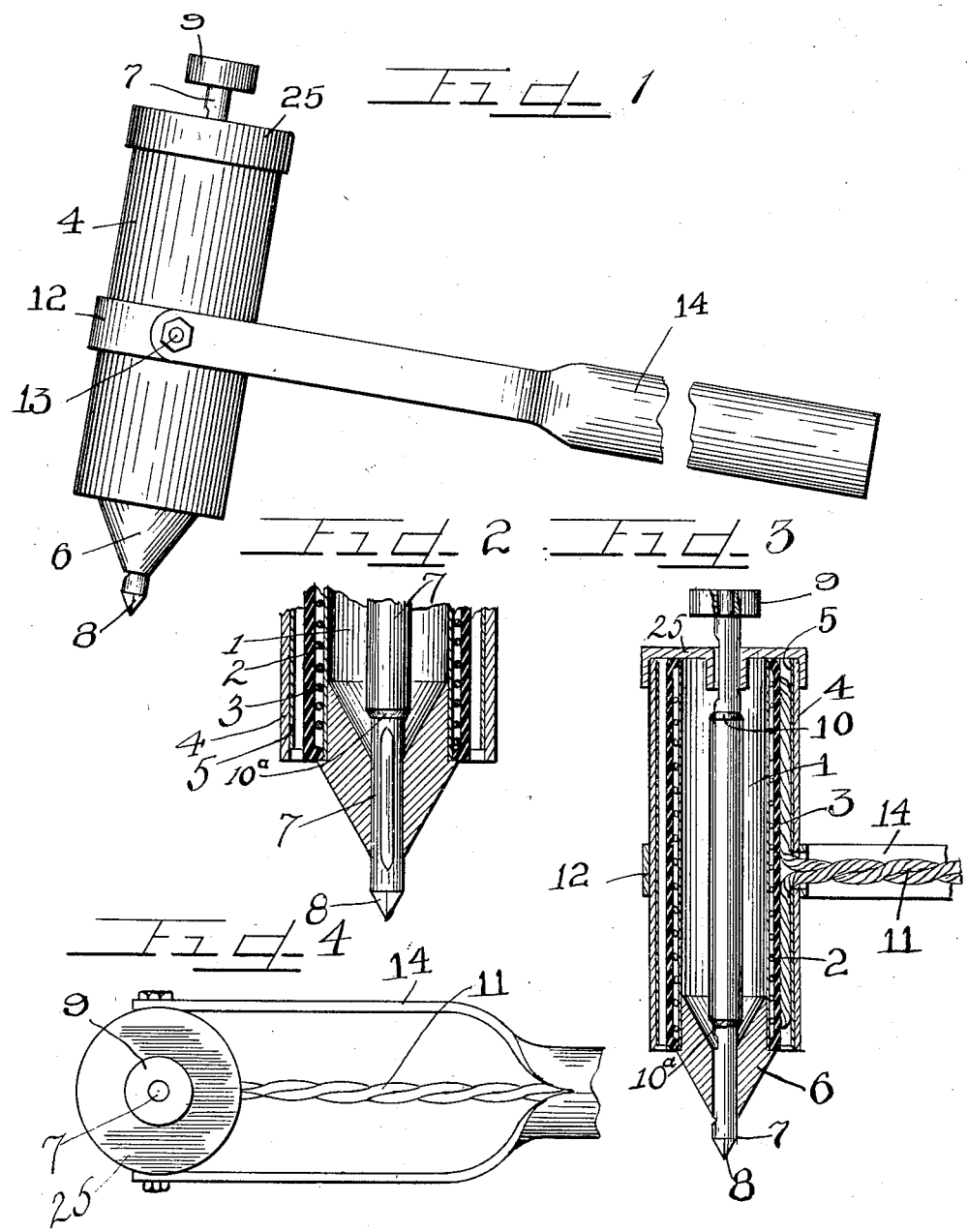

UNITED STATES PATENT OFFICE.

LEVI L. FUNK, OF CHICAGO, ILLINOIS.

SOLDERING-TOOL.

1,006,543.  Specification of Letters Patent.  Patented Oct. 24, 1911.

Application filed January 21, 1910. Serial No. 539,420.

*To all whom it may concern:*

Be it known that I, LEVI L. FUNK, a citizen of the United States, and a resident of the city of Chicago, in the county of Cook and State of Illinois, have invented certain new and useful Improvements in Soldering-Tools; and I do hereby declare that the following is a full, clear, and exact description of the same, reference being had to the accompanying drawings, and to the numbers of reference marked thereon, which form a part of this specification.

This invention relates to soldering tools of that class adapted for practically continuous use when once heated and until the supply of heat is cut off.

The object of the invention is to afford a construction which may be truly termed a fountain soldering tool, in other words, in which the tool having once been heated, a sufficient quantity of solder is fused within the same and is delivered automatically to the point where the same is to be used by the normal operation of the tool.

It is also an object of the invention to afford a soldering tool adapted, if desired, to be electrically heated, thereby enabling the tool to be used continuously without stopping to re-heat.

It is also an object of the invention to afford an exceedingly simple, cheap and durable device by the use of which much time and labor is saved.

The invention consists in the matters hereinafter described and more fully pointed out and defined in the appended claim.

In the drawings Figure 1 is a side elevation of an electric soldering iron embodying my invention. Fig. 2 is an enlarged fragmentary longitudinal section of the lower end of the fountain and the discharge element therein. Fig. 3 is a longitudinal section of the tool on approximately the scale shown in Fig. 1. Fig. 4 is a fragmentary top plan view of the tool. Fig. 5 is a view in elevation of a fountain soldering tool of a slightly modified form. Fig. 6 is an enlarged fragmentary longitudinal section thereof. Fig. 7 is a section on line 7—7 of Fig. 6.

As shown in the drawings: Referring first to Figs. 1 to 4 inclusive, a reservoir adapted to contain the solder is constructed comprising, as shown, an inner metallic shell 1, and an outer investment comprising an insulated metallic electrical circuit 2, on the outer side of which is an insulating shell 3 of any non-conducting and non-combustible material and on the outer side thereof and spaced a suitable distance therefrom is a metallic shell 4, cylindrical in form and having an interior lining 5, of asbestos or other suitable material, and fitted in the bottom of said fountain and rigidly secured in place is the central bored soldering point 6, which, in the construction is shown as conical and having an aperture therethrough in which is fitted a plunger 7, having a pyramidally pointed outer end 8. Said stem or plunger extends upwardly through the fountain and at its upper end (which extends through the cap 25), is provided with a removable button or head 9. The stem or plunger within the fountain is increased in diameter to provide a stop or shoulder 10, to limit the upward movement of said plunger and a stop and closure 10ª, which seats in the tapered bore of the soldering point to both limit the downward movement of the plunger and to tightly close the passage through the soldering point. As shown, the plunger is flattened peripherally both at the point where it extends through the soldering point 6, and where the same extends through the cap 25, so that when at either the upper or the lower limit of its adjustment, the apertures through the cap and the soldering point will be closed, but when said plunger is positioned intermediate the limits of its adjustments, the flow of said hot solder is permitted through the soldering point. At the same time said plunger affords an air vent through the cap to admit the air to facilitate such flow.

The electrical supply cable 11, extends through the side of said reservoir and connects with the ends of the heating coil 2. As shown, a metallic band 12, encircles said reservoir near its middle, and pivotally engaged on the opposite sides of the band by means of set screws 13, is a handle 14, as shown in Figs. 1, 3 and 4. Said cable leads outwardly through said handle and along the same and is adapted to be connected with any suitable source of current.

In the construction shown in Figs. 5 to 7 inclusive, the electrical connections are dispensed with and a soldering point 15, is provided with a relatively large aperture therein and is screw threaded at its upper end to receive the pipe 16, on which is provided a handle 17, of any suitable form or construction. This preferably, however, is of non-conducting material.

As shown, an obliquely directed bore 18, is provided in the lower end of the soldering point, which opens through the side thereof above the lower extremity thereof. Seated at the top of said chamber in the soldering point is a plate 19, which is held in place by the sleeve or handle 16, which is threaded into said point. Slidable through said washer or plate 19, is an actuating stem 20, which extends upwardly and near its upper extremity extends laterally through the side of said sleeve, as shown in Figs. 5 and 6, providing a handle 21. Secured on the lower end of said actuating rod 20, is a cylindric bar 22, shaped at its lower end to fit in and to close the passage 18, leading through the point, and as shown, the upper end of said bar 22, is shaped also to seat on the plate 19, and to close the aperture therefor when the bar is lifted, as shown in Fig. 6.

The operation is as follows: With both constructions a sufficient quantity of solder either in the form of a bar or slugs, is inserted in the fountain and the fountain heated either by means of the electric coil, as shown in Figs. 1 to 4 inclusive, or in the case of Figs. 5 to 7 inclusive, by means of external heat howsoever applied. When proper fusibility is attained the soldering point is applied to the work. In the case of the construction shown in Figs. 1 to 4, the pressure of application serves to press the plunger or rod 7, upwardly to an extent sufficient to open the discharge for the solder to permit the same to flow to the work, this being facilitated by venting through the cap 5.

Inasmuch as the tool is electrically heated, it may be operated continuously until the solder is wholly exhausted or until the work is completed. Should the tool at any time be lifted from the work, gravity serves to force the plunger 7, downwardly immediately cutting off the further flow of solder. In the construction illustrated in Figs. 5 to 7 inclusive, substantially the same is true. The soldering point having been heated sufficiently to fuse the solder and to reduce the same to the proper fluidity, the tool is applied as is usual in soldering, in this instance the bar 22 being retracted by means of the actuating rod 20, which is operated by hand. When fully retracted, as shown in Fig. 6, the flow is somewhat restricted owing to the upper vent being closed. It is only necessary, however, to permit said bar 22, to descend very slightly to again produce the flow and the flow can be regulated very readily by means of the valves formed by the seating of said bar at either of the vents in the tool. Of course, in this construction the solder is placed in the concavity within the soldering point. This is done by unthreading the shank or handle 16, from the soldering point, withdrawing the washer or plate 19, therefrom and inserting a sufficient quantity of solder into the cavity before returning the parts to their proper adjustment.

I claim as my invention:

A fountain soldering tool, comprising a handle, a soldering point or head, an internal reservoir connected to said head, valves at opposite ends of said reservoir for regulating the flow from said reservoir to said head and the admission of air into said reservoir, and a plunger in said reservoir carrying said valves, said valves being constructed and arranged to close at either extreme of movement of said plunger.

In testimony whereof I have hereunto subscribed my name in the presence of two subscribing witnesses.

LEVI L. FUNK.

Witnesses:
LAWRENCE REIBSTEIN,
J. W. ANGELL.